D. Aldrich,
Tanning Apparatus,
Nº 29,656. Patented Aug. 21, 1860.
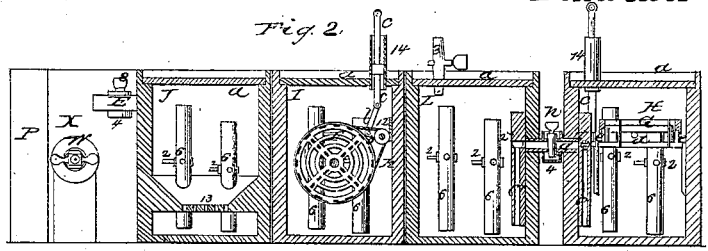
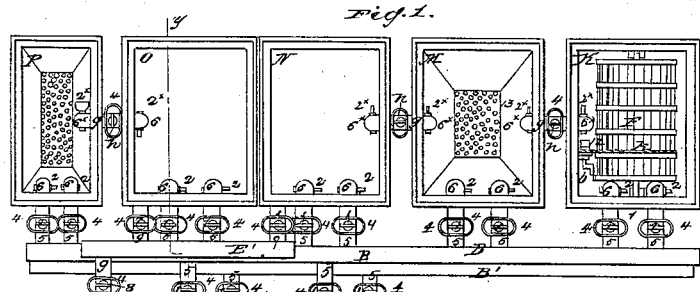
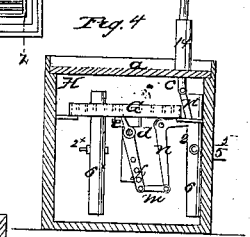
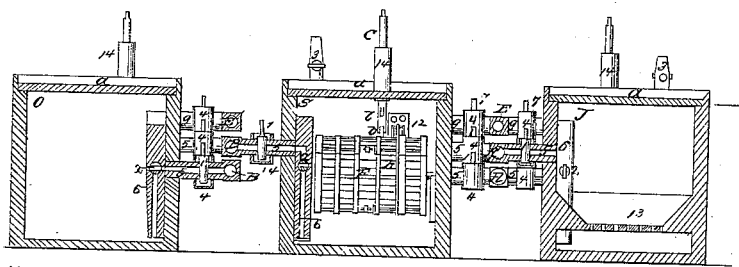
Witnesses  
Woodford, Wm Camant  
James Off
Inventor  
D. Aldrich

UNITED STATES PATENT OFFICE.

DENNIS ALDRICH, OF ST. LOUIS, MISSOURI.

CONSTRUCTION OF TANNING APPARATUS.

Specification of Letters Patent No. 29,656, dated August 21, 1860.

*To all whom it may concern:*

Be it known that I, DENNIS ALDRICH, of the city of St. Louis, State of Missouri, have invented certain new and useful Improvements in Tanning Apparatus; and I do hereby declare that the following is a full, clear, and exact description of the same, reference being had to the accompanying drawings, forming part of this specification, in which—

Figure 1, is a plan of a tan yard with its apparatus constructed and arranged according to my invention, the vats and tanks having their covers removed to show the apparatus inside of them. Fig. 2, is a vertical section of the apparatus in the plane indicated by the line x, x, in Fig. 1. Fig. 3, is a vertical section of the same in the plane indicated by the line y, y, in Fig. 1. Fig. 4, is a vertical section of one of the tan vats in the plane indicated by the line z, z, in Fig. 1.

Similar characters of reference indicate corresponding parts in the several figures.

To enable others skilled in the art, to make and use my invention, I will proceed to describe its construction and operation.

H, H', are tan vats; I, is the handler; J, the tan leach, and K, the bate-vat.

L, L' are the tan liquor vats.

M, is the bate leach; N, the bate-tank; O, the lime tank; P, the lime leach; R, the pool; S, the lime-vat. These tanks and vats are arranged in three rows as shown in Fig. 1, for the convenience of making the several pipe connections. The said tanks and vats are all made of wood, calked and pitched inside to make them tight, of the usual or of any convenient horizontal area, and of about six feet depth; and every one is provided with a movable lid *a*, fitted into a deep rabbet formed recess, provided around the top of the tank, said recess being deep enough to allow the lid to be covered with water or to enable its edges to be covered with suitable paste or cement to prevent the entrance of air when a partial vacuum is produced in the tank or vat, as hereinafter described.

A, A', are two pipes which I call liquor pipes arranged one above another between the middle and one of the outer rows of tanks and vats, and each one connecting both tan-vats H, H', and both tan liquor tanks L, L', with the handler I, and tan-leach J, by means of a number of small branch pipes 5, 5, each fitted with a stop-cock 1, by which either of the said tanks or vats may be shut off from the liquor pipes. The said branch pipes 5, 5, do not terminate in the walls of the tanks or vats but enter upright pipes 6, 6, which are arranged close to the interior of the said walls within the said tanks or vats, such pipes 6, 6, being closed at their upper ends, but open at their lower ends which are within about one inch of the bottoms of the tanks or vats, and being furnished, just below where the branches 5, 5, connect with them, with three way cocks 2, 2', by which the said pipes are made to communicate either with the bottom or the upper part of their respective vessels.

B, B', are two pipes which I call conduct pipes arranged one above the other, between the middle and the other outer row of tanks and vats, and each one connecting the pool R, lime-vat S, lime leach P, lime tank O, and bate vat K, bate leach M, and bate tank N, by means of short branch pipes 5, 5, which, like the branch pipes of the liquor pipes A, A, are furnished with stop-cocks 1, 1, and like those pipes terminate in upright pipes 6, 6, which are arranged within the tanks and vats and provided with three way cocks 2, 2, in all respects like the pipes 6, 6, first described. These pipes and cocks are all best shown in Fig. 3.

E, E, are two air pipes arranged one between the middle and each of the other rows of tanks and vats above the liquor pipes and conduct pipes, with branches 9, 9, connecting the two tan liquor tanks L, L', the bate tank N, and lime tank O, with the air tank X; these branches 9, 9, communicate with the tanks and vats near the tops thereof, and each of those connecting the air pipes with the air tank is furnished with a stop-cock 8, and each of the others with a stop-cock 7. The air-tank X, which must be a perfectly air tight vessel has connected with it, an air pump W, by which to exhaust it, said pump being worked by hand or by steam or other power as may be convenient.

Each of the tan vats H, H', is connected with the adjacent tan liquor tank L or L', by means of a short pipe *g*, fitted with a stop-cock *h*. These pipes do not open directly into the vat or tank, but connect with the vertical pipes 6*, having closed upper ends but open bottoms arranged close against the sides of the vat and tank, like the pipes 6, with which the branches 5, of the liquor pipe and conduct pipe connect. These pipes 6*, are fitted with three-way cocks 2*, like those 2 connected with the branches 5. The bate leach M, is connected with the bate vat K, and bate-tank N, by similar pipes $g$ and 6*, and said pipes are furnished with similar stop-cocks $h$, and three-way cocks 2*, the said pipes 6* running through the false bottom of the lime leach. The tan liquor tanks are each furnished with an air-cock 3, in its cover for the admission of air when necessary. The stop-cocks 1, 1, and $h$, $h$, are each surrounded by a boxing 4, which serves to collect any leakage, and by keeping these boxes filled with water the cocks are rendered air tight.

The leaches J, M, and P, are each constructed with a false bottom 13, which is about two inches above the main bottom. The central portions of these false bottoms are flat and perforated, but toward the sides of the leaches, the said bottoms have an upward inclination, and the inclined portions are not perforated.

The pool R, lime vat S, bate K, and handler I, each contain a cylindrical reel F, whose ends are composed of narrow radial slats and rings of wood and whose sides are composed of narrow longitudinal slats and hoops of the same material. These cylinders have central shafts fitted to work in bearings in the ends of the vesels in which they are placed and each is divided into four compartments by slatted partitions as exhibited in Fig. 2 in the handler I, and each of these compartments is furnished with a hinged door of the whole length of the cylinder, for the introduction of the hides.

To provide for the rotary motion of the cylinders F, each of the vessels containing the said cylinders, contains also a pulley 12, which is secured to a short shaft working in bearings in brackets secured to one side of the vessel, a band $k$, is applied to run around the outside of the reel. The shaft of the pulley 12 is provided at one end with a crank 6, which is connected by a short vibrating connecting rod $l$, with a vertical piston rod $c$, whose piston works air-tight in an upright cylinder 14, attached to the lid of the vessel, said rod passing through the top of said cylinder, for the purpose of enabling it to be worked up and down by hand or by suitable motive power applied outside of the vessel to produce a rotary motion of the pulley 12, and reel.

Each of the tan vats H, H', contains a horizontal frame G, of wood, having slats extended from side to side to hang the hides upon. Each of these frames is balanced upon the ends of the rockers $e$, $e$, attached to a rockshaft $d$, which extends across the vat and works in bearings in the sides thereof. The said rockshaft is furnished with an arm $f$, which is connected by a link $m$, bell crank lever $n$, and vibrating connecting rod $p$, as shown best in Fig. 4, with a vertical piston rod $c$, which works through a cylinder 14, attached to the lid $a$, of the vat in the same manner as the piston rods by which the reels are operated. By working this rod $c$, $c$, up and down by power applied to its upper end, a reciprocating motion in a nearly horizontal direction is imparted to the frame G.

The process of tanning with this apparatus is conducted in the following manner. A number of hides or skins are placed in each of the compartments of the reel F, in the pool R, in which there must be sufficient clear water, to keep the reel submerged; and the said reel is then set in motion by power applied to its piston rod $c$, and kept rotating for about six hours, or until the hides are perfectly cleansed of dirt, blood or saline matter that may have been in them; the water being changed as often as it becomes dirty during this part of the process, by allowing it to run off, and introducing fresh, by pipes and cocks not necessary to be herein described.

From the reel F, of the pool the hides are removed to the reel F, in the lime-vat S, which then has its lid put on and secured closely. The lime-leach having been charged with slaked lime, water is introduced above the charge by suitable means, not necessary to be here described, and the lime-vat S, is placed in communication with the lime leach P, and with the lime-tank O, by means of the conduct pipes B, B, and its branches 5, 5, by opening the stop-cocks 1, 1, and the lime-tank O, is placed in communication with the air-tank X, by opening the proper stop-cocks 7 and 8, in the branches of the air-pipe E. Vent is then given to the lime leach P, by removing its lid or leaving it loose, and the air tank X, lime tank O, and lime vat S, are exhausted by setting the air pump W, in operation and the lime vat S, is filled with lime water forced from beneath the bottom of the lime leach P, by atmospheric pressure, said water passing up the pipes 6, of the lime leach through the branches 5, and pipes B, into the lime vat S. When it is desired to strengthen the lime water in the vat S, the lime leech is put in connection as before described with the vat S, and put in direct communication with the lime-tank O, by opening the stop-cock $h$, between them, after which by giving vent to lime-vat S, by opening its lid, the lid of the leach P, being in the mean time closed, and placing the lime-tank into communication with the air tank and starting the air pump, the water is forced back into the lime leach P. In this operation, the three-way cocks 2 of the pipes 6, in the lime leach should be turned to admit the water above the lime that it may percolate through it.

The lime being thus strengthened may be forced back to the lime vat S, in the manner before described. By the use of two lime tanks O, a constant circulation of liquor can be kept up through the lime leach P, and lime vat S. While the hides are in the lime vat S, the cylinder may be kept in motion constantly or set in motion from time to time.

When the hides or skins have been sufficiently limed they are removed from the lime vat S and prepared for the bate and put in the reel F of the bate-vat K, whose connections with the bate leach M, and bate tank N, and air tank, are similar to the connections of the lime vat with its respective leach and tank and with the air tank, and the operation of the bate vat is conducted in the same manner as that of the lime-vat as before described, the bate-leach having been previously charged with bating material. Having been thus prepared for coloring, the hides or skins are placed in the reel F, of the handler I, which by opening and closing the proper cocks in the liquor pipes A, A', and air-pipe E can be put in communication with the tan liquor tanks L, L', and tan leach J, and the hides or skins be operated upon in the same manner as in the lime vat and bate vat, except that tan liquor is used, in place of the lime liquor or bate liquor. After having been sufficiently colored, the hides or skins are suspended from the slats of the frames G, G, in the tan-vats H, H, and after the covers of the said vats have been put on and secured, the tan-vat H, is connected with the tan-leach J, by one of the pipes A, A, and its branches 5, 5, by opening the proper cocks 1, 1, and is connected with its adjacent tan-liquor tank L, by opening the cock $h$, of their respective direct connection pipe $g$, and the said tan liquor tank L, is by means of the air pipe E, and its branches 9, brought into communication with the air tank X, and the other tan liquor tank L', is by means of the other of the pipes A', A', and its branches 5, 5, brought into communication with the tan-leach J, the pipe 6, of the tan leach which is in connection with the tank L', having its cock turned to such position as to open the upper aperture of the said pipe, and the other pipe 6 of the said leach, having its cock reversed. Then by opening the cock 3, of the tank L', and setting the air pump in operation to exhaust the air-tank X, the liquor is forced by atmospheric pressure from the said tank L, to the tan leach where it falls upon, and percolates through the tanning material and passes through the false bottom 13, from below which, it is caused to pass by the opposite pipe 6 of the leach to that from which it enters and the liquor-pipe A or A', to the tan-vat H. By opening and closing the cocks to place the tan-vats H', in the same relation to its respective tank and L, as just described of H, and L, and reversing the above described relation of the tanks L, L', with the tan leach and air-tank, opening the air-cock of L, and setting the air-pump in operation, the vat H' may be filled from the tank L. By completely reversing the communication between the tan liquor tank, air tank, and tan-leach from either of the above described conditions, the liquor may be returned through the tan-leach; and by a proper manipulation of the cocks while the air-pump is in operation a constant current of tan-liquor through the tan leach, where it receives the tanning principle, and the tan vats where it is absorbed, may be kept up. The reciprocating motion of the frames G, G, of the tan-vats, already described is kept up during the tanning process.

The practical advantages derived from the use of an apparatus composed of a series of air tight vessels with air pump and system of connections such as are herein described, are as follows. It is well known to tanners that when a hide is limed in open vessels and frequently exposed to the air, it becomes so hard and crusty, that in order to soften it, such a decomposing bating process is necessary that the hide is brought so nearly to a putrefactive condition that its substance is materially changed, and it is not unfrequently seriously damaged; and it is also well known that in using tan liquor in open vats, the liquor readily absorbs the acidifying principle from the atmosphere and the tannic acid is so changed to gallic acid, which latter not possessing any tanning principle, but hurry a dissolving effect on the fiber of the hide thereby damaging its textile strength, is productive of great loss, and being of the same color and density as tannic acid is a dangerous obstacle in the way of successful tanning. On the contrary, by using air tight vats for liming the change and loss in quality of the lime liquor is avoided; and by using such vats for tanning, every species of chemical change in the tan liquor is avoided; and in bating the use of air tight vessels is of no less advantage as it permits the retention of all of the free ammoniacal gas, which gas performs so important a part in facilitating the neutralizing of any remaining lime in the hide and cleansing the cuticle of all extraneous matter.

By the use of the reel in the lime tanks, the positions of the hides are constantly changing and they are presented to the action of the lime liquor to the best advantage, the hair and epidermis being loosened and the hide being left in a naturally soft condition in a short space of time. Corresponding advantages result from the use of the reel in the bate-vat and in the handler.

By the use of the reciprocating frames G, in the tan-vats, the hides or skins being suspended at a distance apart just sufficient to permit the circulation of the tan-liquor between them, are caused to be brought very uniformly and rapidly into contact with the tan liquor, the absorption of which is thereby accelerated.

By the use of the perforated false bottom with inclined sides, in the leaches, the different substances are leached by percolation, by which means from fifteen to twentyfive per cent. more strength can be obtained from tanning material than by either of the old modes of maceration or filtration.

What I claim as my invention and desire to secure by Letters Patent is—

1. The combination in the manner herein shown and described of air tank X, with air pump attached, air pipes E, E, tan liquor tanks L, L, lime tanks O, and bate tanks N, so that the liquid may be changed or moved by atmospheric pressure to and from each and every tank thus combined all as set forth.

2. Providing the leaches with inclined bottoms in connection with false bottoms which have their central portions perforated when the said inclined portions extend upward from the said perforated portions toward the walls of the vats as and for the purposes set forth.

3. The combination with the frames G, G, of rockers e, e, attached to rock shaft d, for the purpose of imparting a reciprocating motion to the frames G, G, substantially as described.

4. The construction of the reels F, with radial slotted partitions forming several compartments and with a hinged door to each compartment substantially as and for the purpose herein specified.

5. The employment in the pipes 6, of three way cocks 2, when applied so as to open communication at either the upper or lower part of said pipes as described.

DENNIS ALDRICH.

Witnesses:
 WOODFORD W. McCAMANT,
 JAMES COFF.